United States Patent [19]
Schuller et al.

[11] 3,942,551
[45] Mar. 9, 1976

[54] HYDRAULIC DAMPING MEANS FOR HINGED CHECK VALVE

[75] Inventors: Ronald A. Schuller; Al D. Hogan, both of Tulsa, Okla.

[73] Assignee: Wheatley Company, Tulsa, Okla.

[22] Filed: Mar. 6, 1975

[21] Appl. No.: 556,191

[52] U.S. Cl. .................. 137/514; 137/554; 251/54; 251/291
[51] Int. Cl.² ........................................ F16K 21/10
[58] Field of Search .................... 137/514, 522, 554; 251/291, 54; 303/85; 188/314; 92/9

[56] References Cited
UNITED STATES PATENTS

| | | | |
|---|---|---|---|
| 2,830,859 | 4/1958 | Parsons | 188/314 X |
| 2,976,961 | 3/1961 | Mead | 188/314 X |
| 3,147,827 | 9/1964 | Weisheit | 251/54 X |
| 3,176,801 | 4/1965 | Huff | 92/9 X |
| 3,177,894 | 4/1965 | Camp | 137/514 |
| 3,427,930 | 2/1969 | Roberts et al. | 251/54 X |
| 3,706,321 | 12/1972 | Vicari | 137/554 |
| 3,789,872 | 2/1974 | Elliott | 137/514 |

*Primary Examiner*—William R. Cline
*Attorney, Agent, or Firm*—Cox, Smith, Smith, Hale & Guenther Incorporated

[57] ABSTRACT

An improved hydraulic control means for check valves to prevent slamming of a clapper against a seat. The clapper of the check valve is connected via a crosshead to an hydraulic cylinder and a piston contained therein controls the closing of the check valve. The hydraulic cylinder has means restricting flow of fluid from below the piston in the hydraulic cylinder to above the piston in the hydraulic cylinder, but permits unrestricted flow in the opposite direction. Relief valves are included to prevent overpressurization in the hydraulic cylinder. A precharged accumulator allows for fluid expansion and contraction in the hydraulic cylinder, plus replacing fluid lost by leakage.

11 Claims, 5 Drawing Figures

HYDRAULIC DAMPING MEANS FOR HINGED CHECK VALVE

CROSS REFERENCE TO RELATED PATENTS

This application is related to U.S. Pat. No. 3,177,894 issued Apr. 3, 1965 to George Camp entitled "Control Action Check Valve" and U.S. Pat. No. 3,789,872 issued Feb. 5, 1974 to Robert E. Elliot entitled "Hydraulic Control Means for Check Valves", both of which are hereby incorporated by reference copies being enclosed with the present patent application.

BACKGROUND OF THE INVENTION

This invention relates to check valves and, more particularly, to a controlled action check valve wherein the closing of the check valve is retarded to prevent slamming.

Most check valves that are of the medium and large size as used by the petroleum production industry are constructed in the form of a clapper pivotally mounted on a shaft over a seat contained in an enlarged portion of the flow line. The clapper is free to pivot open if fluid is flowing in one direction, but if fluid begins to flow in the opposite direction the clapper will close and seal the flow line to prevent further reverse flow. Hydraulic control systems for such check valves have previously been disclosed as shown in the Camp patent incorporated by reference. Camp uses a hydraulic cylinder connected through a crosshead and a rod to the clapper portion of the check valve. The hydraulic cylinder has restrictive flow of fluid from below a piston contained therein to above the piston and vice/versa. An accumulator keeps the hydraulic cylinder recharged with a sufficient amount of fluid. The pressure of the fluid contained in the hydraulic cylinder is equal to the pressure in the pipeline due to interconnecting passages between the crosshead and the accumulator.

The incorporated Elliot patent shows a hydraulic control portion wherein the pressure on the hydraulic fluid was supposed to be very low. In Elliot, again a piston in a hydraulic cylinder was connected through a crosshead to the clapper by means of a connecting rod. Also in Elliot the piston rod which connects to the crosshead is extended through the top portion of the hydraulic cylinder thereby preventing a need for large amounts of fluid to flow from below the piston to above the piston and vice/versa because the same volume area of the piston rod is always inside the hydraulic cylinder. Elliot also included a rifle drill passage in the piston rod to bleed any air out of the hydraulic cylinder upon installation or repairs of that apparatus. Both of these prior incorporated patents had disadvantages that are not included in the present invention as will be described in more detail hereinafter.

SUMMARY OF THE INVENTION

It is an object of the present invention to provide a hydraulic control mechanism to control closing of a check valve.

Another object of the present invention is to provide a hydraulic cylinder having a piston connected to a piston rod through a crosshead to a clapper portion of a check valve in a flow line; the hydraulic cylinder having restricted flow from below the piston to above the piston to retard the closing of the clapper but not the opening.

Yet another object of the present invention is to provide a hydraulic control mechanism for retarding the closing of a check valve wherein the hydraulic fluid is at a relatively low pressure. A minimum amount of flow is required in the hydraulic cylinder upon opening and closing of the check valve connected to the piston, said hydraulic cylinder having a precharged accumulator for resupplying hydraulic fluid.

It is still another object of the present invention to provide a hydraulic control mechanism for a check valve wherein air trapped within the hydraulic cylinder may flow to the top thereof for venting to the atmosphere to prevent interferrence with the normal movement of the piston in the hydraulic cylinder.

It is still another object of the present invention to provide a mechanism wherein additional hydraulic fluid can be added to a hydraulic cylinder used to control the opening and closing of a check valve without interrupting the normal operation of the hydraulic cylinder and/or check valve.

It is still another object of the present invention to provide a hydraulic control mechanism to retard the closing of a check valve contained in a flow line wherein the pressure in the flow line is connected both above and below the hydraulic cylinder, yet the fluid in the hydraulic cylinder being at a very low pressure and supplied by a precharged accumulator connected thereto. Air trapped in the hydraulic cylinder below a piston is allowed to flow through a restrictive orifice, in the piston to the top thereof for venting to the atmosphere. The hydraulic cylinder can thereafter be charged while still in operation by connection to a pump which forces additional fluid into the hydraulic cylinder through a valve. Pressure above and below the hydraulic cylinder is equal because the piston rod extends through the hydraulic cylinder and has equal pressure on both ends thereof. The upper portion of the piston rod extending through the top of the hydraulic cylinder may be used to hold the clapper in its uppermost position to allow reverse flow through the flow line.

It is a further object of the present invention to provide a hydraulic control mechanism for controlling the closing of a check valve in a flow line, said hydraulic control mechanism having safety relief valves to prevent excessive pressurization and an indicating means to tell if the check valve is open.

It is yet another object of the present invention to provide a means for securely fastening a hydraulic control mechanism to a housing containing a check valve to prevent leakage at the point of connection to the valve body.

A normal clapper type check valve is connected in a flow line having a medium or large size diameter. The clapper portion of the check valve is connected through a rod and a crosshead to a piston rod. The piston rod extends upward into a hydraulic cylinder and connects to a piston contained therein, the piston rod continuing upward past the piston and through the top portion of the hydraulic cylinder. Above the hydraulic cylinder is an upper rod chamber that is pressurized to a pressure equal to the pressure in the pipeline and below the hydraulic cylinder. The fluid contained in the hydraulic cylinder when in the static condition is at approximately ten psi. During the opening of the clapper the fluid contained in the hydraulic cylinder flows freely from above the piston to below the piston. During the closing of the clapper, fluid contained in the hydraulic cylinder has restricted flow from below the piston to above the piston thereby retarding the speed at which the clapper can be closed. Special relief valves are included to prevent excessive pressurization in the hydraulic cylinder either due to a rapid, excessive backflow against an open check valve or due to an overfill of the accumulator. Also valving is included for the bleeding of gas from the hydraulic cylinder and the recharging of fluid in the accumulator. An interconnecting conduit between the crosshead cylinder and the upper rod chamber may be closed and the upper rod chamber bled down to atmospheric pressure. Then the upper rod chamber can be opened and the clapper pulled to its uppermost position with a pulling bar and turning rod. This would allow a backflow through the check valve. In case air forms below the piston, a bleed orifice allows the air to slowly rise to the upper portion of the hydraulic cylinder and it may thereafter be bled to atmosphere to prevent interference with the normal operation of the device.

DESCRIPTION OF THE PREFERRED EMBODIMENT

Figure 1:
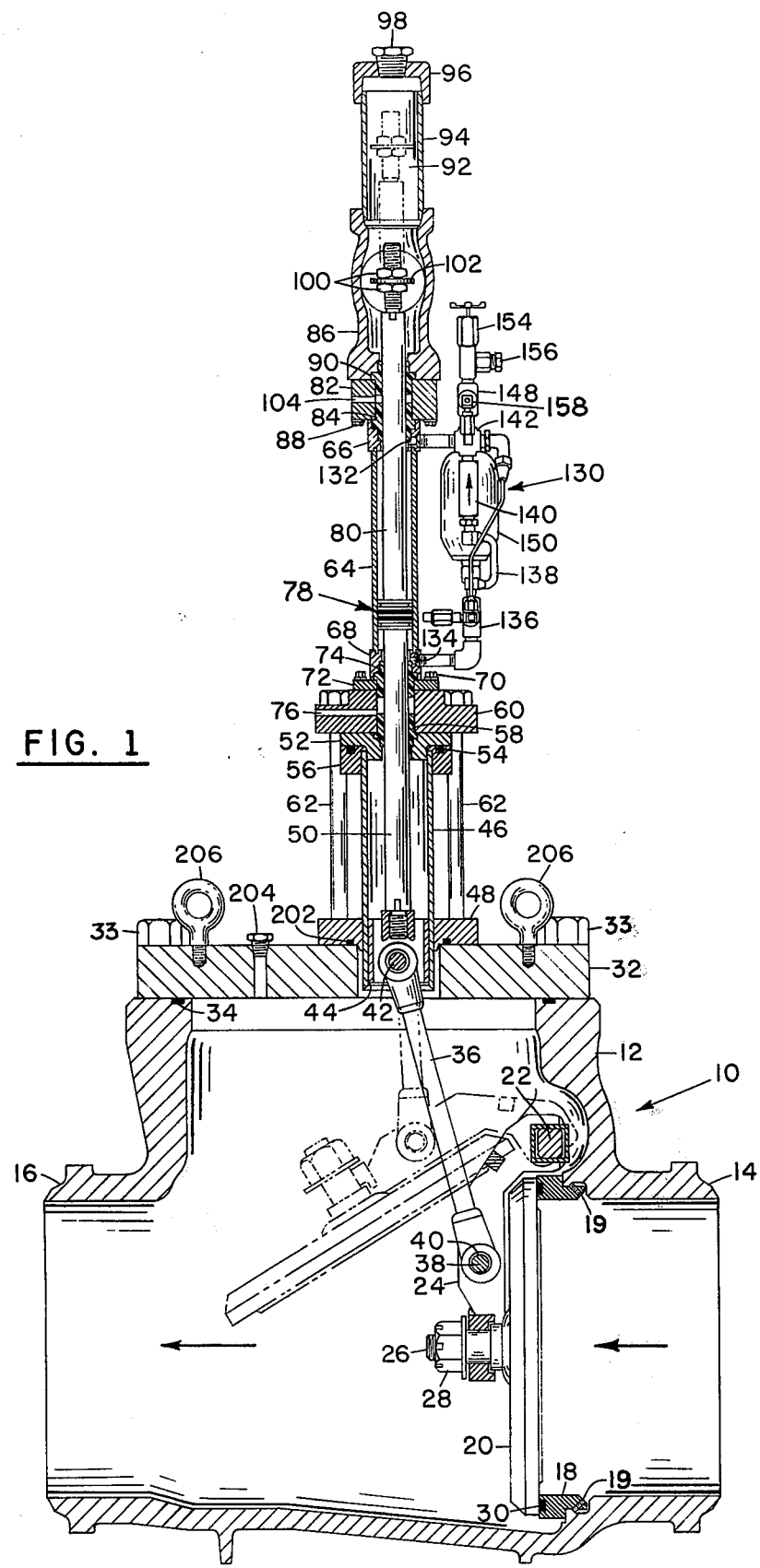
FIG. 1 is a partial sectional, elevated view of a check valve and associated hydraulic control mechanism to prevent rapid closing of the check valve.

Referring now to FIG. 1 of the drawings, there is shown a check valve represented generally by the reference numeral 10 having a valve body 12 and extensions 14 and 16 for connecting into a flow line. Inside of the valve body 12 a valve seat 18 is securely fastened thereto by means of Allen screws 19 so that an air tight connection is formed between the valve body. 12 and the valve seat 18. A clapper 20 is pivotally connected in valve body 12 by means of hinge pin 22 and clapper arm 24. Clapper arm 24 is connected to the clapper 20 by means of bolt 26 and locking nut 28. Between the clapper 20 and valve seat 18 is located a sealing element 30.

The upper portion of the valve body 12 is enclosed by a valve cover 32 with sealing element 34 being located therebetween. Valve cover 32 is secured to valve body 12 by bolts 33. Extending into the valve cover 32 is a connecting rod 36 that is pivotally connected on one end through lower pin 38 and bushing 40 to clapper arm 24. The upper portion of the connecting rod 36 is pivotally connected through wrist pin 42 to a crosshead 44. The crosshead 44 is slideably contained in crosshead barrel 46 which is securely connected by means such as welding to barrel flange 48.

The crosshead 44 is connected to lower piston rod 50 which extends through the uppermost portion of crosshead barrel 46. Barrel cover 52, which has a center hole allowing the lower piston rod 50 to extend therethrough, covers the uppermost portion of crosshead barrel 46 and presses against O-ring seal 54 of an upper flange 56 which is commonly welded to the crosshead barrel 46. A rod seal kit 58 is located around lower piston rod 50. Cylinder adaptor 60 secures the crosshead barrel 46 by means of tie-bolts 62 that connect into valve cover 32.

The lower piston rod 50 extends through a center opening of cylinder adaptor 60 into hydraulic cylinder 64 that has an upper flange 66 and a lower flange 68, the upper and lower flanges 66 and 68 being connected thereto by conventional means such as tie bolts. The lower flange 68 is connected to the cylinder adaptor 60 by means of bolts 70 through lower flange 72. Located between flange 72 and cylinder adaptor 60 is a rod seal kit 74 to seal around lower piston rod 50. Between the two rod seal kits 74 and 58 is an opening connected by tattletale hole 76 to the atmosphere.

Contained in hydraulic cylinder 64 is piston 78 which connects to lower piston rod 50 and upper piston rod 80. Upper piston rod 80 extends through connecting flange 82 which is securely fastened to upper flange 66. Between upper flange 66 and upper piston rod 80 is located rod seal kit 84 to prevent leakage of the hydraulic fluid from hydraulic cylinder 64. The connecting flange 82 is attached to upper housing 86 by means of bolts 88. Again, located between upper housing 86 and upper piston rod 80 is a rod seal kit 90 to prevent leakage from upper rod chamber 92. Forming a portion of upper rod chamber 92 is a cylinder 94 covered by means of cap 96 and plug 98. The uppermost portion of the upper piston rod 80 is threaded for receiving jam nuts 100 with washer 102 contained therebetween as will be described in more detail subsequently. Tattletale hole 104 will indicate if rod seal kit 84 or 90 is leaking.

Figure 2:
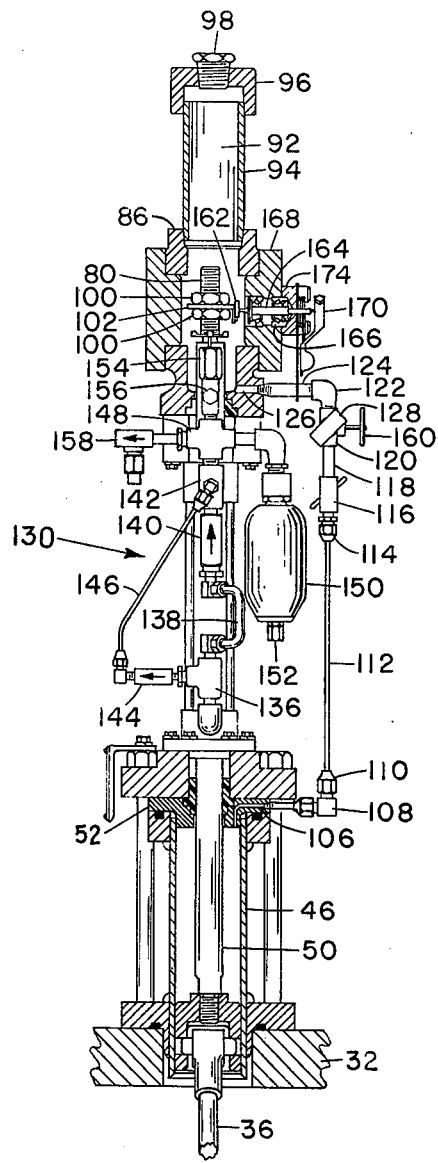
FIG. 2 is a partial sectional, elevated view of the hydraulic control mechanism shown in FIG. 1, but rotated 90°.
Figure 3:
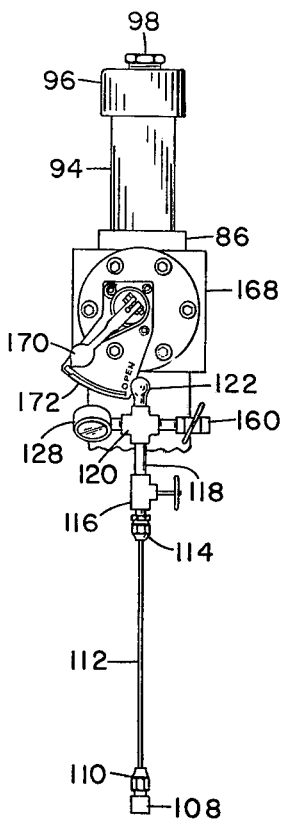
FIG. 3 is an elevated view of the upper valving shown in FIGS. 1 and 2, but rotated another 90°.

Referring now to FIGS. 1, 2 and 3 in combination, the interconnecting plumbing above and below piston 78 will be described. Passage 106 in barrel cover 52 connects the inside of crosshead barrel 46 and valve 10 to the upper rod chamber 92 via elbow 108, tubing nut 110, tubing 112, tubing nut 114, valve 116, conduit 118, pipe cross 120, elbow 122, conduit 124 and passage 126. By the opening of valve 116 the pressure contained in crosshead barrel 46 is also delivered to upper rod chamber 92. Connected to one side of cross 120 is a pressure gauge 128 to give an accurate reading of the pressure inside of valve 10. Since the lower piston rod 50 is approximately the same diameter as the upper piston rod 80, and the pressure above and below hydraulic cylinder 64 is approximately the same, in cases of uniform flow through valve 10 substantially no force will be exerted on piston 78 to cause a movement thereof.

The top and bottom of piston 78 contained in hydraulic cylinder 64 are connected by means of plumbing, represented generally by reference numeral 130, that connects passage 132 in upper flange 66 to passage 134 in lower flange 68. Without describing each part of the plumbing 130 in complete detail, passage 134 below piston 78 is connected to pipe tee 136. One side of the pipe tee 136 is connected through tubing 138 to control valve 140 (which will be described in more detail subsequently) which in turn connects to pipe cross 142 and passage 132. Basically control valve 140 allows unrestricted fluid flow therethrough in the direction opposite that shown by the arrow thereon, but a restricted metered type of flow in the direction indicated by the arrow; therefore, in the opening of the clapper 20 and subsequent upward movement of piston 78 the fluid contained above piston 78 freely moves through control valve 140 to below piston 78. However, upon closing of the clapper 20 control valve 140 has a restricted fluid flow thereby preventing the fluid trapped below piston 78 from rapidly flowing through plumbing 130 to above piston 78. This regards the closing of clapper 20 to prevent slamming against valve seat 18 and destruction of the check valve 10.

Since there are times when there may be a surging backflow through valve 10, thereby creating a tremendous pressure below piston 78 a relief valve 144 has been connected to one side of pipe tee 136 and via tubing 146 to pipe cross 142. If the pressure below piston 78 becomes excessive, relief valve 144 will open allowing unrestricted flow to the upper portion of hydraulic cylinder 64. A normal setting for relief valve 144 is approximately 3,000 pounds per square inch. If pressure below piston 78 exceeds 3,000 pounds per square inch, relief valve 144 will open thereby preventing damage to the hydraulic cylinder 64 and associated parts.

Connected to the upper side of pipe cross 142 is a second pipe cross 148 to which is connected accumulator 150. Accumulator 150 is of a conventional type having a restrictive orifice type of feed at the uppermost portion and a charging valve 152 at the bottom thereof. A pressure of approximately ten psi is applied through charging valve 152 to the diaphragm of the accumulator 150. The top of pipe cross 148 is connected through valve 154 to atmosphere. The atmosphere connection from valve 154 is normally filled by plug 156. After installation of the present apparatus or repairs to the hydraulic control portion it may be necessary to insert or add additional hydraulic fluid to hydraulic cylinder 64. Another reason for adding hydraulic fluid may be due to leakage from the hydraulic cylinder 64. With valve 154 still closed, plug 156 is removed and a source of hydraulic fluid is connected thereto. Now by opening valve 154 and applying pressure to the hydraulic fluid by means of a pump (not shown) additional hydraulic fluid can be added to the system without interferring with its normal operation. After adding the necessary hydraulic fluid, valve 154 is closed and the source is disconnected and plug 156 reinserted.

In case gas or atmosphere leaks into the hydraulic cylinder 64, it will tend to float to the top. Since valve 154 is located at the top, plug 156 can be removed and valve 154 opened slightly to bleed out the accumulated gas from the hydraulic cylinder 64. Air trapped below piston 78 will also accumulate at the top of the hydraulic cylinder 64 as will be described in more detail subsequently.

Connected to the pipe cross 148 opposite the accumulator 150 is a relief valve 158. The relief valve 158 is simply a safety feature to prevent excessive pressure in the hydraulic cylinder 64 due to liquid expansion and contraction. Upon charging of the accumulator 150 it is possible for the accumulator to be completely filled with the hydraulic fluid thereby preventing any cushioning effect that would normally occur due to the pre-charged pressure applied through charging valve 152. Relief valve 158 would simply relieve excessive pressure caused by expansion of the fluid with changes in temperature. The setting for relief valve 158 should be equal to or greater than the setting for relief valve 144. Normal upward movement of piston 78 will not open relief valve 158 because of the unrestricted flow through metering valve 140 upon upward movement of the piston 78.

Referring now to FIGS. 2 and 3 in combination, there is shown a valve 160 that connects through pipe cross 120 to upper rod chamber 92. If valve 116 is closed and valve 160 is opened, pressure contained in upper rod chamber 92 will be vented to atmosphere.

As was described previously jam nuts 100 hold washer 102 into place on the upper portion of upper piston rod 80. When the clapper 20 is closed upper piston rod 80 moves to its lowest position, thereby causing washer 102 to press against lever arm 162 of shaft 164. The lever arm 162 turns shaft 164 which is mounted in bearings 166 of cover plate 168 to move indicating arm 170. Behind indicating arm 170 is indicating plate 172 which tells whether clapper 20 is open or closed. It should be realized that the opening through which shaft 164 extends is sealed by gland 174 and that the indicating arm 170 only indicates the clapper 20 is open, and not how far open clapper 20 may be.

Figure 4:
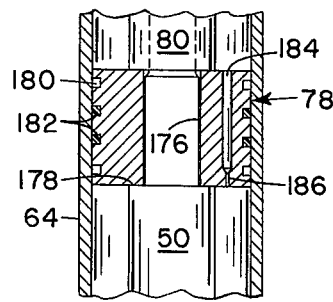
FIG. 4 is an enlarged cross sectional view of the hydraulic piston shown in FIG. 1.

Referring now to FIG. 4 of the drawings, there is shown an exploded cross sectional view of piston 78 as contained in hydraulic cylinder 64. Piston 78 which has center opening 176 contained therein sets on shoulder 178 of lower piston rod 50. The upper piston rod 80 is threadably connected to lower piston rod 50 thereby securely holding piston 78 into position. The piston 78 which has a series of four ring grooves 180 with only two ring grooves having rings 182. Drilled into piston 70 is passage 184 having a metered orifice 186 contained at the bottom. The metered orifice 186 can have an approximate size of 1/64th of an inch and connects the lower portion of hydraulic cylinder 64 to the upper portion thereof. The reason for including metered orifice 186 is to allow trapped gases below piston 78 to gradually flow through the metered orifice 186 to reach the uppermost portion of the hydraulic cylinder 64 so that the gas may be bled to atmosphere as previously described. Upon initial installation, or upon leakage around the lower piston rod 50 air may be trapped below piston 78. The metered orifice 186 is of such a small size that it would not significantly effect the operation of the hydraulic cylinder 64 in retarding the slamming of clapper 20.

METHOD OF OPERATION

Assume that the hydraulic control mechanism has been installed with check valve 10 and is ready for operation. If fluid flows through the check valve 10 in the direction indicated by the arrows, clapper 20 will be raised to the position illustrated by the phantom lines. In the raising of clapper 20, connecting rod 36 and crosshead 44 move upward thereby moving lower piston rod 50, piston 78 and upper piston rod 80 upward. Hydraulic fluid as contained above piston 78 will freely flow through metering valve 140 to below piston 78. Pressure in check valve 10 feeds into crosshead barrel 46, through tubing 112 and into upper rod chamber 92. This gives an equal pressurization on both sides of piston 78 as felt through equal diameter upper and lower piston rods 80 and 50, respectively.

Now assume there is a reverse flow of fluid in check valve 10, clapper 20 will tend to move to the position shown in FIG. 1 and the fluid trapped below piston 78 will flow through metering valve 140 to above piston 78; however, metering valve 140 allows only restricted flow of fluid in the upward direction as indicated by the arrow thereon. This restricted flow through metering valve 140 will allow a gradual closing of clapper 20 to prevent slamming against valve seat 18 and possible damage to check valve 10. If the reverse flow through check valve 10 is a sudden surge, it is possible that the pressure below piston 78 may exceed the limits of relief valve 144 thereby causing it to open allowing a free flow of fluid from below piston 78 to above piston 78.

Relief valve 158 will only open if there is excessive pressurization in the hydraulic cylinder 64 due to complications such as overfill of the accumulator 150 and fluid expansion. If any of the rod seal kits 58, 74, 84 or 90 leak it will be indicated by their respective tattletale hole 76 or 104.

OPTIONAL ACCESSORY

Figure 5:
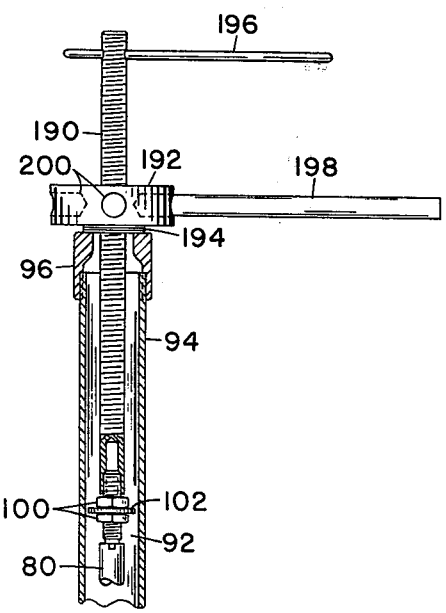
FIG. 5 is a cross sectional, elevated view of the upper portion of FIGS. 1 and 2 having a clapper raising tool connected thereto.

Referring now to FIG. 5 of the drawings there is shown an optional mechanical clapper raiser illustrated generally by the reference numeral 188. After the upper rod chamber 92 is relieved of pressure by closing valve 116 and opening valve 160 the plug 98 may be removed. Through the hole normally filled by plug 98 is inserted clapper raising rod 190 which is threadably connected to rotating nut 192. Below rotating nut 192 are shim type bearings 194 to allow easy turning of the rotating nut 192. The clapper raising rod 190 is threadably connected to upper piston rod 80 in the manner shown in FIG. 5. A hold bar 196 extends through a hole drilled in the uppermost portion of the clapper raising rod 90 and rotating nut 192 is turned until it rests snugly against shim bearings 194. A turning bar 198 is inserted in one of holes 200 to turn rotating nut 192 on clapper raising rod 190. As the rotating nut 192 presses against shim bearings 194 it will raise upper piston rod 80 and connected piston 78 along with lower piston rod 50, connecting rod 36 and clapper 20. All of this can be done manually to raise the clapper 20 into its uppermost position thereby allowing reverse flow through valve 10 for the purpose of running a squib or sphere in a reverse direction through the flow line connected to valve 10. Other than relieving the pressure in upper rod chamber 92, the hydraulic control portion is still the same.

After the hydraulic control portion of check valve 10 has been operating for a period of time the tattletale holes 76 and 104 will give a visual indication as to whether the rod seal kits 58, 74, 84 and 90 are leaking. Also, any air that may have collected in the hydraulic cylinder can be bled to atmosphere through valve 154. Any additional hydraulic fluid that needs to be added to the hydraulic cylinder 64 can be inserted through valve 154.

Though not described in detail previously the tie bolts 62 which screw into valve cover 32 are very accurately positioned and located in holes contained in barrel flange 48. This insures that barrel flange 48 will make a good seal with valve cover 32 by compressing O-ring seals 202 against the valve cover. In large check valves barrel flange 48 would have a tendency to leak. If the clapper 20 is closed, any residual pressure in a section of the flow line can be drained by opening valve 160 while simultaneously having valve 116 open. However, the same pressure can be relieved by simply removing plug 204 in valve cover 32. Hooks 206 simply aid in the handling of the heavy check valve 10 and associated hydraulic controls.

We claim:

1. A hydraulically controlled check valve for use in a high pressure pipeline, said check valve having a hinged clapper and a seat sealable against said clapper to prevent reverse flow, the improvement comprising an hydraulic control portion of the check valve which includes:
   a hydraulic cylinder having a piston slidably contained therein, said hydraulic cylinder being filled with a hydraulic fluid;
   piston rod slidably and sealably received in said hydraulic cylinder and extending through both ends thereof, said piston being connected to said piston rod in said hydraulic cylinder;
   crosshead means for connecting the first end of said piston rod to a clapper connecting rod, movement of said clapper connecting rod, said crosshead means, said piston rod and said piston being controlled by movement of the clapper to which the clapper connecting rod is attached, pressure on the first end of said piston rod being equal to pressure in the check valve;
   chamber means connected to said hydraulic cylinder for receiving a second end of said piston rod, said chamber means communicating and receiving pressure through a first valve means from the check valve;
   valve passageway means providing communication between the opposite sides of the piston for controlling the flow of hydraulic fluid from one side of the piston to the other and allowing substantially unrestricted flow in an opposite direction, said controlled flow restricting movement of said piston and said clapper to prevent slamming against the seat; and
   accumulator means communicating with said hydraulic cylinder, said accumulator being of a small precharged type to allow for fluid expansion and contraction and small amounts of fluid leakage.

2. The hydraulically controlled check valve as recited in claim 1 wherein said piston includes orifice means for allowing gases in said hydraulic cylinder to slowly collect in one end thereof.

3. The hydraulically controlled check valve as recited in claim 2 wherein said gases may be discharged through a second valve means, said second valve means being connectable to a source of pressurized hydraulic fluid for recharging said accumulator with hydraulic fluid.

4. The hydraulically controlled check valve as recited in claim 1 further includes a first relief means around said valve passageway means to prevent pressures above a first predetermined level in said hydraulic cylinder upon rapid closing of said clapper.

5. The hydraulically controlled check valve as recited in claim 4 further includes a second relief means connected to said hydraulic cylinder, said second relief means discharging hydraulic fluid from said hydraulic cylinder to atmosphere if pressure exceeds a second predetermined level, said first predetermined level being less than said second predetermined level.

6. The hydraulically controlled check valve as recited in claim 1 wherein said crosshead means is slideably located in a crosshead barrel attached to a cover of the check valve, said crosshead barrel being positioned and secured by tie bolts extending through a flanged portion to seal against high pressure leaks from said check valve.

7. The hydraulically controlled check valve as recited in claim 1 further includes a third valve means connecting said chamber means to atmosphere, upon closing said first valve means and opening said third valve means said chamber means may be opened for connecting said piston rod to a clapper raising means, said clapper raising means being manually operable for raising and holding said clapper in an uppermost position.

8. The hydraulically controlled check valve as recited in claim 1 further includes an indicator means operable by vertical movement of said piston rod to move a lever which turns an indicator to show if the clapper in the check valve is open.

9. In a check valve of the clapper type installed in a high pressure gas pipeline including a hinged clapper, the improvement comprising means to control the slamming of said clapper against its seats on reversal of flow, comprising:
   a. a chambered cylindrical hydraulic apparatus having in a central chamber a cylinder having hydraulic liquid therein, a piston slidably and sealably received in said cylinder;
   b. a first piston rod attached to said piston on a first side and sealed through a first header on a first end of said cylinder, said first piston rod extending into a first gas chamber;
   c. said first gas chamber attached at its first end to said first header and at its second end to the housing of said valve, said first gas chamber exposed to the gas pressure in said valve, slider means in said first gas chamber attached to said first piston rod;
   d. connecting rod means rotatably connected to said clapper and to said slider;
   e. second piston rod means attached to the second side of said piston and sealed through a second header on the second end of said cylinder, said second piston rod extending into a second gas chamber;
   f. said first and second piston rods having substantially equal cross sectional areas opened to the pressure in the respective gas chambers;
   g. said second gas chamber comprising a sealed chamber attached to said second header;
   h. bypass means extending between the first and second gas chambers for equalizing the pressures therein with the gas pressure in the valve;
   i. valved passageway means providing communication between the opposite sides of the piston for controlling the flow of hydraulic liquid from one side of said piston to the other and allowing substantially unrestricted liquid flow in an opposite direction; and
   j. accumulator means connected to said cylinder, said accumulator means being of a low precharged pressure type to allow for fluid loss around said headers and fluid expansion and contraction.

10. The check valve as recited in claim 9 further includes orifice means in said piston for allowing gas to rise to said second end of said cylinder, said second end of said cylinder having a coupling through which said accumulator communicates to said cylinder and through which a valve means communicates to said cylinder, gas in said cylinder being discharged through said valve means and fluid in said accumulator means being replenished through said valve means without interferring with the normal operation of said check valve.

11. The check valve as recited in claim 10 further includes a relief valve for discharging fluid from said cylinder if pressure in said accumulator exceeds a predetermined level, excessive pressure normally being caused by overfilling said accumulator and fluid expansion.

* * * * *